(No Model.) 2 Sheets—Sheet 1.
H. BRADFORD.
METHOD OF SAVING FLOATING MATERIALS IN ORE SEPARATION.
No. 345,951. Patented July 20, 1886.
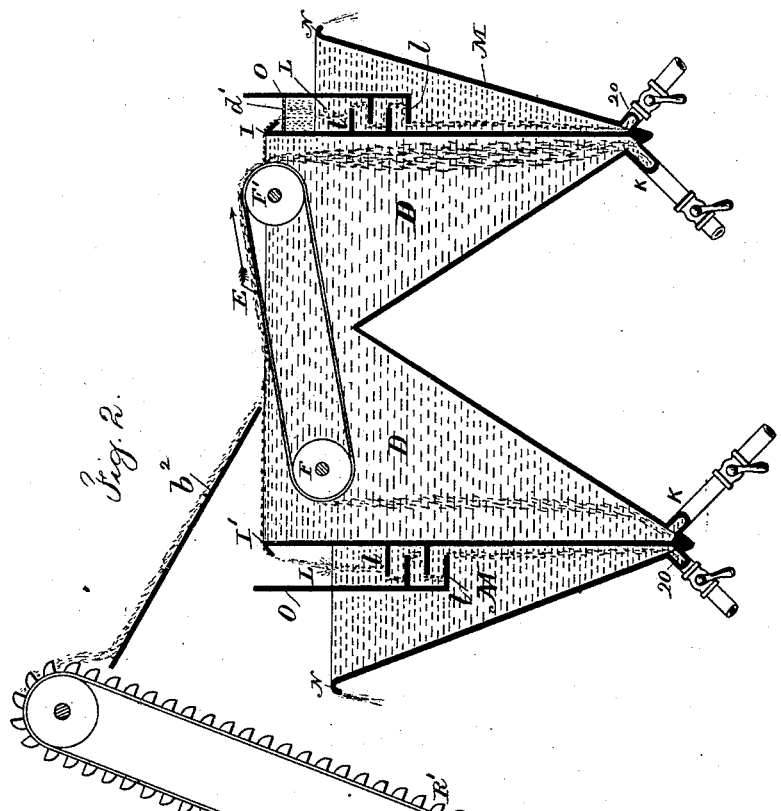
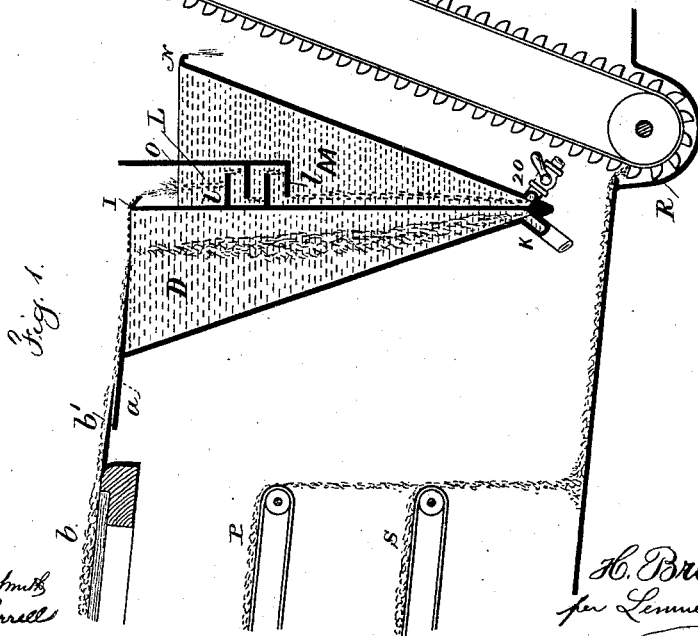

(No Model.) 2 Sheets—Sheet 2.
H. BRADFORD.
METHOD OF SAVING FLOATING MATERIALS IN ORE SEPARATION.
No. 345,951. Patented July 20, 1886.
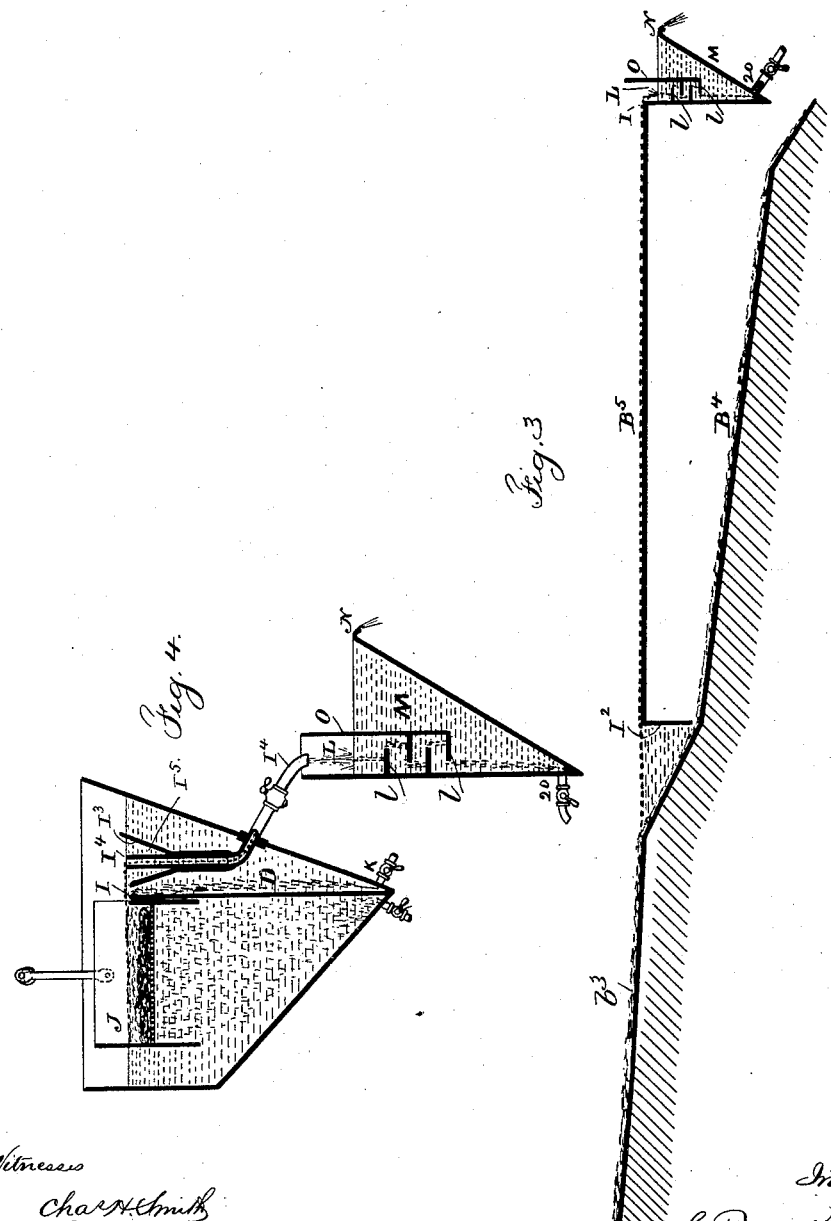

UNITED STATES PATENT OFFICE.

HEZEKIAH BRADFORD, OF PHILADELPHIA, PENNSYLVANIA.

METHOD OF SAVING FLOATING MATERIALS IN ORE-SEPARATION.

SPECIFICATION forming part of Letters Patent No. 345,951, dated July 20, 1886.

Application filed June 22, 1885. Serial No. 169,342. (No model.)

*To all whom it may concern:*

Be it known that I, HEZEKIAH BRADFORD, of Philadelphia, in the State of Pennsylvania, have invented an Improvement in Methods of Saving Floating Materials in Ore-Separation, of which the following is a specification.

Almost all metallic ores—coal and other substances—when pulverized, contain a greater or less proportion of particles of ore or metal that will, even if pulverized in water, float on the surface of the water, and the finer the substances are pulverized the greater the proportion of floating particles. These floating particles appear to possess some peculiar quality which repels the water from their surfaces, especially when such particles are exposed, even momentarily, to atmospheric air, and when such exposure takes place the water is repelled from a sufficient portion of their surfaces to cause such particles to float off on the surface of the waste water from the other particles that sink in the water.

In concentrating ores they should be pulverized fine enough to liberate the metallic particles and the particles of native metals from their gangue. They are then, or should be, sized with screens. The larger sizes are, or should be, concentrated in jigs. The finer sizes are, or should be, concentrated by concussion-tables similar to the "Rittinger table," or by some of the various vanning-machines.

In amalgamating ores the quicksilver will not act on the base metallic ores; neither will it act on the particles of native metal unless the particles are brought in contact with the quicksilver, and consequently all the particles that float off over the amalgamating-pan are lost.

In the concentration of coal from slate as heretofore practiced a considerable proportion of coal, iron pyrites, and some slate will float off and be lost, and there are many other substances which while being concentrated or washed in water have heretofore floated off and been lost.

In the drawings, Figure 1 is a section representing my improvement as applied to the separator known as the "Rittinger table."

Fig. 2 represents the improvement as applied to an ore-separator of the class known as the "Frue vanner." Fig. 3 represents the improvement as adapted to a trough or similar delivery device through which the tailings pass, and Fig. 4 represents the improvement as adapted to the tailings from a jig.

My present invention consists in a method of saving floating materials in ore-separation by passing such floating materials along upon the surface of the water, with but little agitation of the water, thus preventing such materials from subsiding, and then causing the water and floating materials to plunge or fall into a water-receptacle, and retaining said floating materials in said receptacle until they lose their floating power and sink. To accomplish this I attach to the end of the table $b$ a metal plate, $b'$, on a level with the table and of the same descent, and fit it so evenly as to cause no ripple in the water as it passes from the table to the plate. This plate is wide enough to catch all the tailings, the waste water, and the floating material as these substances leave the lower end of the table, and catch none of the concentrations, and as the line where the concentrations and tailings meet on the table changes back and forth this plate must be so attached to the end of the table that it can be moved back and forth as this line changes on the table. This plate $b'$ must be attached also as nearly parallel as possible with the line of motion of the table.

Under the plate $b'$, and as close to it as possible, I provide a stationary metal plate, $a$, which receives the water, the tailings, and the floating material without ripple, and conveys the same to the top of the water in tank D. This plate $a$ is preferably a little more inclined than the plate $b'$, as it has no motion. Both plates should have just descent enough to deliver the substances upon the top of the water in tank D with as little force as possible, and the plate $a$ should touch the top of the water, so that the substances will not plunge under the water of the tank D or make any unnecessary ripple; nor should said plate $a$ dip under the water, as that would cause an eddy in the current on the top of the water by the discharge of the substances from plates $b'$ and $a$, and this eddy, by detaining the floating particles, would cause some of them to sink among the tailings. As soon as these substances strike the water of the tank D, the tailings will immediately sink to the bottom of the tank, while the floating particles will pass, with a part of the waste water, over the overflow I of tank D into a receptacle, L, in tank M, with a fall sufficient to plunge the floating particles under water. This receptacle L should be small enough so that the whole surface of the water therein will be constantly acted upon by the plunging water, in order to thoroughly wet the floating particles, some of which will rise many times to the top of the water before they get wet enough to sink; and to insure the fall of the water, so as to cover the whole surface of the receptacle L, a perforated plate, $d'$, may be used, as shown in Fig. 2, with holes enough and large enough to shower the water over the whole of this receptacle L. In this receptacle L, I provide a series of shelves, $l$, to break the force of the plunging water, so that when it passes down below the lower shelf with the metallic particles it will produce no agitation in the main body of the water in the tank M, and the particles that floated are so thoroughly wet as to sink below the bottom shelf, and to continue to sink until they reach the bottom of tank M, and they will not float again without exposure to atmospheric air. The water will pass off at the overflow N of tank M free from floating material. Where there is not fall enough from the end of table $b$ or the end of vanners P and S, or where plates like $b'$ could not be attached for conveying the tailings, the waste water, and the floating materials directly to the tank D without ripple, the substances must be conducted to trough R, from which these substances must be raised by an elevator, R', high enough to be deposited in the trough or incline $b^2$, which will deliver them upon the belt E, a portion of which is immersed in water in tank D, and the upward motion of this belt will elevate these tailings and floating materials out of the water, so that atmospheric air will come in contact with the tailings. When the belt delivers these substances again to the water, the tailings will immediately sink in the water to the bottom of the tank D, while the particles that repel the water will float and pass off over the overflow I into a receptacle, L, of tank M, similar to that shown in Fig. 1, where all the floating particles will become wet enough to sink, and the waste water will pass away at the overflow N. All the particles that float on the top of the water, as the substances are deposited in the water on the belt E, will float out at the overflow I' into a tank similar to M, where these particles will sink and the waste water pass off free from floating material. The belt may be made of rubber, like a Frue-vanner belt, with ridges on both edges to prevent the substances from running over the sides of the belt, or it may be made of any other suitable material, but should have ridges at the edges of the belt. The belt should fit the tank closely, so that the floating particles from the lower end of the belt will pass off at the overflow I'. All the tanks should be discharged at the bottom continuously through stop-cocks or other equivalent means. Where the waste-water way has but little descent, I provide a trough, $b^3$, Fig. 3, at an incline just enough to carry off these substances a sufficient distance to procure, if possible, a depth for the dam $I^2$ of at least twelve inches. The floating particles will pass with a small portion of the waste water to the dam I, and the tailings will pass away at the bottom of the dam with part of the waste water, which will carry off all the tailings.

The dam I, vessel M, and the parts for saving the floating material are similar to those shown in Fig. 1.

Where the ore is too coarse in size to be concentrated on tables, it is generally concentrated in jigs, (see J, Fig. 4.) Any particles that float on the water will pass out of the jig J with the tailings at the overflow I. The tailings will sink in the water in the tank D as soon as they pass this overflow, and will be discharged at the bottom of the tank by the pipe and cock K, and the floating material will pass, with a portion of the waste water, into a receptacle, $I^3$, which is contracted at the bottom to a size just sufficient to form a pocket, $I^5$, that will hold an upright pipe, $I^4$, in the center of this receptacle, which pipe ought to be of sufficient size to carry off a part of the waste water and all of the floating material from the jig. The bottom of the pocket is extended through the side of the jig, and has a stop-cock at the end, where the waste water and the floating material should be continuously discharged into a receptacle, L, in the tank M. The conical receptacle $I^3$ should have a flat side toward the overflow, extending the whole length of the overflow of the jig, and should be placed just far enough, but no farther, from the overflow I to allow all the tailings to settle before the waste water and floating material reach the receptacle $I^3$. The reason for this is, that some of the floating particles have only a little floating capacity, and many will sink before they float far. When they once float over the receptacle $I^3$ with part of the waste water, the current caused by the suction of the discharge-pipe $I^4$ in the center of the receptacle $I^3$ will draw the floating particles, and the waste water and the floating material are discharged into the receptacle L in the tank M, where the floating material will be saved, as before described. Any particles that sink in the receptacle $I^3$ before they reach the pipe $I^4$ can be discharged from the receptacle by raising the pipe $I^4$ from the pocket.

All the tanks are discharged at the bottom through stop-cocks, which should be so regulated as to discharge just water enough to carry out their respective deposits.

If it should be desirable to again expose the tailings from tank D and trough B⁴ to the action of atmospheric air, they can be conducted in any convenient way to a trough, like R, elevated by an elevator, like R', and delivered onto a belt, like E, in tank D, where such particles as would float could be saved.

The shelves in receptacle L, instead of being horizontal, may be placed at an angle sufficient to discharge the particles of floating material as fast as such particles settle on such slanting shelves—say at an angle of seventy-five degrees—which will prevent agitation in the water in the main body of the tank nearly or quite as well as the horizontal shelves, taking care to have ample room for the water to pass away between the shelves.

In depositing the water, tailings, and floating material on the belt E, a small portion of fine tailings may, in the agitation caused by such deposit, pass off into tank D at the lower end of belt. Any such tailings will sink in the tank and pass off at stop-cock K.

This improvement is available with ores or tailings that are either in a wet or dry condition. When such materials are in a dry condition, they are to be scattered upon the water by sifting or otherwise near the surface, so as to fall upon the water with but little concussion. A part of the metallic portions will float, and most of the earthy portions will absorb moisture and sink. I therefore do not limit myself to any particular manner of supplying the material to be operated upon, or of causing the particles that are to be separated to float.

I do not claim a separating device in which the water and tailings from a stamp or other reducing-machine pass through a pipe to a vessel in which the particles of ore are to be gathered as they float, because in so doing the materials that may have floated are carried down under water and considerable sinks. By my improvement any particles that come to the surface are kept up, so that they may not sink until they reach the place where they are saved.

I do not herein lay claim to the means employed for the conduct of the method, but reserve the right to apply for a separate patent thereon.

I claim as my invention—

The method herein specified of saving floating materials in ore-separation, consisting in passing the water and floating materials along in an open unobstructed sheet from the table or separating-machine with but little agitation of the water, thus preventing such materials from being carried beneath the surface and subsiding, then causing the water and floating materials to plunge or fall into a water-receptacle, and then retaining said floating materials in said receptacle until they lose their floating power and sink, substantially as specified.

Signed by me this 20th day of June, A. D. 1885.

HEZEKIAH BRADFORD.

Witnesses:
  GEO. T. PINCKNEY,
  WALLACE L. SERRELL.